(12) United States Patent
Knipe

(10) Patent No.: US 8,608,000 B2
(45) Date of Patent: Dec. 17, 2013

(54) LID FOR A CONTAINER WITH A SLIDER

(71) Applicant: Huhtamaki Oyj, Espoo (FI)

(72) Inventor: Stephen Knipe, Hayling Island (GB)

(73) Assignee: Huhtamaki Oyj, Espoo (FI)

(*) Notice: Subject to any disclaimer, the term of this patent is extended or adjusted under 35 U.S.C. 154(b) by 0 days.

(21) Appl. No.: 13/671,056

(22) Filed: Nov. 7, 2012

(65) Prior Publication Data

US 2013/0112699 A1    May 9, 2013

(30) Foreign Application Priority Data

Nov. 8, 2011  (EP) .................................. 11008876

(51) Int. Cl.
| | |
|---|---|
| B65D 39/00 | (2006.01) |
| B65D 51/18 | (2006.01) |
| G09F 3/10 | (2006.01) |
| B65D 85/00 | (2006.01) |
| G09F 9/00 | (2006.01) |

(52) U.S. Cl.
USPC ........ 215/230; 220/253; 220/715; 220/254.4; 220/254.7; 215/365; 40/311; 206/459.1; 206/459.5; 116/306; 116/309; 116/307; 116/311; 116/312; 116/315; 116/316; 116/318; 116/319

(58) Field of Classification Search
USPC ............ 220/715, 254.4, 254.1, 254.2, 254.3, 220/254.9, 254.7, 253, 212; 215/365, 235, 215/236, 239, 230, 228; 40/311; 116/306, 116/309, 307, 311, 312, 315, 316, 318, 116/319; 206/459.1, 459.5

See application file for complete search history.

(56) References Cited

U.S. PATENT DOCUMENTS

| | | | | |
|---|---|---|---|---|
| 2,791,846 | A * | 5/1957 | Muelberger, Jr. ................ | 40/311 |
| 4,183,443 | A * | 1/1980 | DeParales et al. ............ | 220/714 |
| 5,082,134 | A * | 1/1992 | Ramsey ........................ | 220/711 |
| 5,148,936 | A * | 9/1992 | DeGrow .................... | 220/254.3 |
| 5,294,014 | A * | 3/1994 | Wyatt et al. .................... | 220/253 |
| 6,220,470 | B1 * | 4/2001 | McHenry et al. .......... | 220/254.4 |
| 6,352,166 | B1 * | 3/2002 | Copeland ................... | 220/254.2 |
| 2003/0089714 | A1 * | 5/2003 | Dart et al. .................. | 220/254.3 |
| 2008/0029512 | A1 | 2/2008 | Smith et al. | |
| 2008/0142519 | A1 | 6/2008 | Chou | |

FOREIGN PATENT DOCUMENTS

| | | |
|---|---|---|
| DE | 7540150 U | 5/1976 |
| GB | 2054538 A | 2/1981 |
| WO | 2009132049 A2 | 10/2009 |

* cited by examiner

Primary Examiner — Anthony Stashick
Assistant Examiner — Don M Anderson
(74) Attorney, Agent, or Firm — Husch Blackwell LLP

(57) ABSTRACT

The present invention relates to a lid for a container holding a flowable substance which comprises a mounting portion to be attached to the container and an opening to remove the flowable substance from the container, whereas the opening is opened and closed by means of a slider which is connected to the lid and rotates around a vertical axis.

2 Claims, 7 Drawing Sheets

LID FOR A CONTAINER WITH A SLIDER

CROSS-REFERENCE TO RELATED APPLICATIONS

This Application claims priority to European Application Number 11008876.2 filed Nov. 8, 2011, to Stephen Knipe entitled "Lid for a container with a slider," currently pending, the entire disclosure of which is incorporated herein by reference.

FIELD OF THE INVENTION

The present invention relates to a lid for a container holding a flowable substance which comprises a mounting portion to be attached to the container and an opening to remove the flowable substance from the container, whereas the opening is opened and closed by means of a slider which is connected to the lid and rotates around a vertical axis.

BACKGROUND OF THE INVENTION

Such a lid is e.g. known from WO 2006/039044 A2. However, the lid disclosed in this patent application has hygienic deficiencies and is rather complicated in its design.

SUMMARY OF THE INVENTION

It was therefore the objective of the present invention to provide a lid which does not comprise the deficiencies of the state of the art.

This objective is attained by a lid for a container holding a flowable substance, which comprises a mounting portion to be attached to the container and an opening to remove the flowable substance from the container, whereas the opening is opened and closed by means of a slider, which is connected to the lid and rotates around a vertical axis, whereas the connection is a form-fit- and/or force-fit-connection between a convexity in the lid and an opening in the slider.

The present invention relates to a lid for a container holding a flowable substance. Such a container is preferably a cup made e.g. from a paper, cardboard or a plastic material. This container is e.g. filled with a drinkable substance, e.g. tea, coffee, a soft drink or an alcoholic beverage like beer. The flowable substance can also be a food substance like e.g. soup. After the flowable substance has been filled into the container, the container is closed with the inventive lid, which is attached to the upper rim of the container. Therefore, the lid comprises a mounting portion to be attached to the container. Furthermore, the inventive lid comprises an opening to remove, preferably drink, the flowable substance from the container. According to the present invention, this opening can be opened and closed by means of a slider, whereas the opening is opened to remove the liquid from the container and is subsequently closed again. This slider is connected to the lid and rotates around a vertical axis into a closing- and an opening position.

According to the present invention, this connection is utilized by a form-fit- and/or force-fit-connection between a convexity, i.e. a bulge or a protrusion which extends away from the container, and an opening in the slider. This opening is e.g. pushed on the convexity of the lid.

The inventive lid is easily produced and very hygienic, because the flowable substance cannot accumulate in the convexity.

The lid can be made from a paper, a plastic and/or a fiber material. The lid is preferably formed from a plain material under the influence of pressure and/or heat, more preferably deep drawn.

The slider can be made from a plastic material and more preferably moulded.

The convexity may be a truncated cone, which is preferably deep drawn. The diameter of the cross section of the cone can increase with its height, i.e. with its extension away from the container, so that the convexity comprises a draft angle. Thus, as soon as the opening, which may be a circle with a smaller diameter than the largest outer diameter of the cross section of the cone, is pushed over the truncated cone, it is fixed to the cone in a faun-fit- and/or force-fit-connection.

Furthermore, the slider can comprise a content indicator. This content indicator, e.g. one or more letters or one or more numbers or a symbol, indicates the user of the inventive lid which flowable substance is in the container.

In one embodiment, the inventive lid comprises a multitude of content indicators. Depending on the substance in the container, one of these indicators is brought into an indicating position, to inform the user about the content in the container. Therefore, each content indicator may be hingeably connected to the slider and rotatable from a remote, position into an indicating position, preferably around a horizontal axis.

Each content indicator can comprise a first and a second surface, whereas both surfaces comprise the identical information about the content in the container. The surfaces are preferably opposite of each other. In the remote position, the information on the first surface can be seen and in the indicating position, the information on the second surface is visible.

In one embodiment, of the present invention, the slider comprises a fastening means, preferably a rebound, to fix the content indicator in its indicating position. This fastening means assures that the content indicator remains in its indicating position. The fastening means can be a snap-fit-connection. This fastening means is e.g. a rebound and/or a groove, whereas the a rim of the content indicator snaps into this fastening means.

In one embodiment, the content indicator deforms the convexity in its indicating position. This compression improves the four-fit- and/or force-fit-connection between the convexity and the slider. More preferred, the content indicator deforms the convexity such that it extends into the fastening means, preferably the rebound of the lid. This embodiment of the present invention further improves the connection between the lid and the slider.

Preferably, the slider can be rotated by an angle of 360° around the convexity, more preferred in two directions.

In another embodiment of the present invention, the top wall of the lid comprises an annular ring whose upper surface is tapered, preferably tapered towards the center of the lid. This embodiment of the present invention assures that liquid which is spilled on the lid flows towards the center of the lid and not towards the rim of the lid.

The lid may comprise a vent hole. This vent hole is preferably arranged on the convexity of the lid, preferably in the center of the convexity of the lid. In one embodiment, this vent hole remains open even after the content indicator has been fixed in its indicating position and/or even after the convexity has been deformed.

According to yet another embodiment of the present invention, the opening is located in an indentation. This indentation may be arranged in the top wall of the lid. The indentation can be produced by forming or deep drawing. This embodiment of the present invention has the advantage that fluid in the vicinity of the opening, which is captured in the indentation, flows back into the container and is not spilled. The indentation can be arranged in an annular ring of the lid.

According to yet another embodiment of the present invention, the opening of the lid is sealed in a sealing plane which lies above the opening i.e. the opening is not sealed at its circumference but in a horizontal plane which is located above the opening, i.e. in a plane which is part of the upper surface of the lid. This embodiment has the advantage that a sealing means of the slider, e.g. a plug, does not need to fit exactly into the opening in order to achieve an essentially fluid tight sealing. Thus, larger production tolerances can be allowed without losing a fluid tight sealing.

According to another embodiment of the present invention, the slider comprises sealing means which are pre-stressed against the lid. This embodiment results in an even more fluid tight lid and/or larger production tolerances can be allowed.

Another embodiment of the present invention is a method for attaching a slider to a lid, whereas an opening of the slider is pushed on a convexity of the lid and that the convexity is then at least partially compressed.

According to the inventive method, the opening of the slider is first pushed on a convexity of the lid. This results in a form-fit- and/or force-fit-connection which pre-fixes the slider on the lid. Subsequently, the convexity is at least partially compressed. This compression can be an elastic- and/or plastic compression. The compression further improves the connection between the slider and the lid without limiting the rotatability of the slider relative to the lid.

The disclosure made to the inventive lids also applies to the inventive method and vice versa.

The convexity can be compressed by the content indicator, while the content indicator is rotated from its remote to its indicating position.

Other and further objects of the invention, together with the features of novelty appurtenant thereto, will appear in the course of the following description.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views.

Identical components are designated by identical reference numerals throughout the figures.

DETAILED DESCRIPTION OF THE INVENTION

Figure 1:
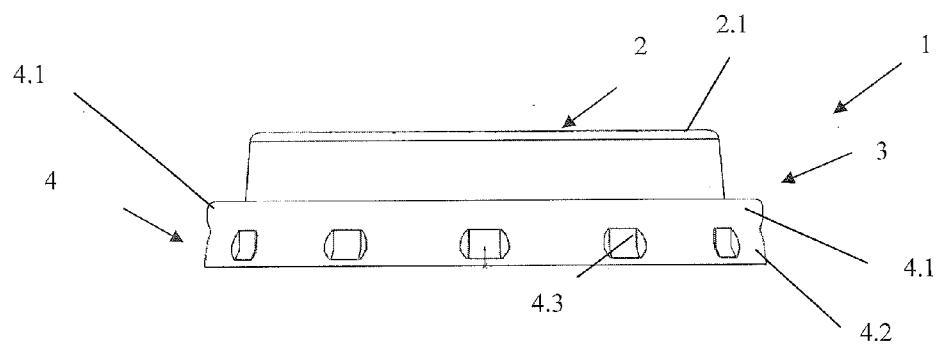
FIG. 1 is a side view of a lid in accordance with one embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Figure 2:
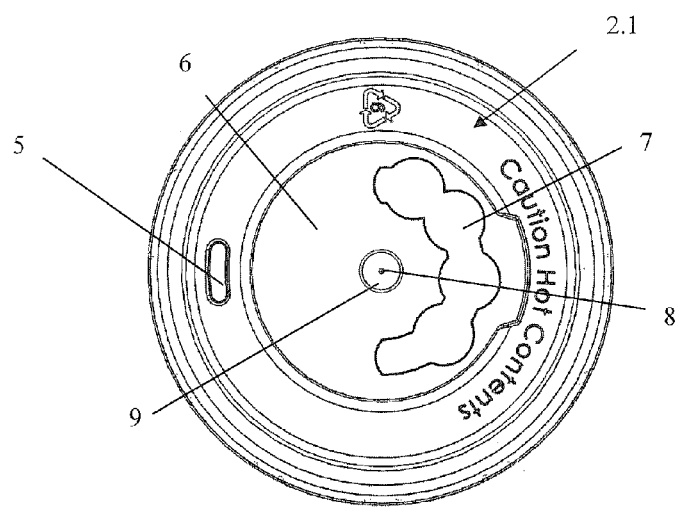
FIG. 2 is a top view of a lid in accordance with one embodiment of the present invention.

FIGS. 1 and 2 show a side and a plan view of one embodiment of the lid (1). This lid comprises an essentially horizontal top wall (2) and a side wall (3), which extends from the rim of the top wall (2). At its lower end, the side wall comprises a mounting portion (4) with an annular flange (4.1) and a skirt (4.2). In its closed stage, the annular flange (4.1) fits on the rim of a container, e.g. a cup to be closed, while the skirt extends below the rim of the container and secures the lid on the container. Depressions (4.3), which are optional, improve the attachment of the lid to the container. On its upper surface (2.1) the inventive lid comprises an opening (5) for the removal of the fluid in the container. Furthermore, the inventive lid comprises a convexity (9), e.g. a boss or a spigot, for the connection of a slider to the lid. Optionally, the inventive lid comprises a first recess in the center of the lid. Due to this first recession, an annular ring at the outer circumference of the top wall is formed. In this first recession spilled fluid can be captured. Optionally, the lid comprises a second recess, which extends from the first recess. The second recess can be utilized to rotate content indicators (11) as e.g. shown in FIG. 11 from a remote-into an indicating position.

Preferably, the inventive lid comprises a vent hole (8) which is more preferably located on the convexity (9) and even more preferably located in the center of the convexity (9). A vent hole can be utilized to discharge a gas from the closed container or to drag air into the closed container.

Figure 3:
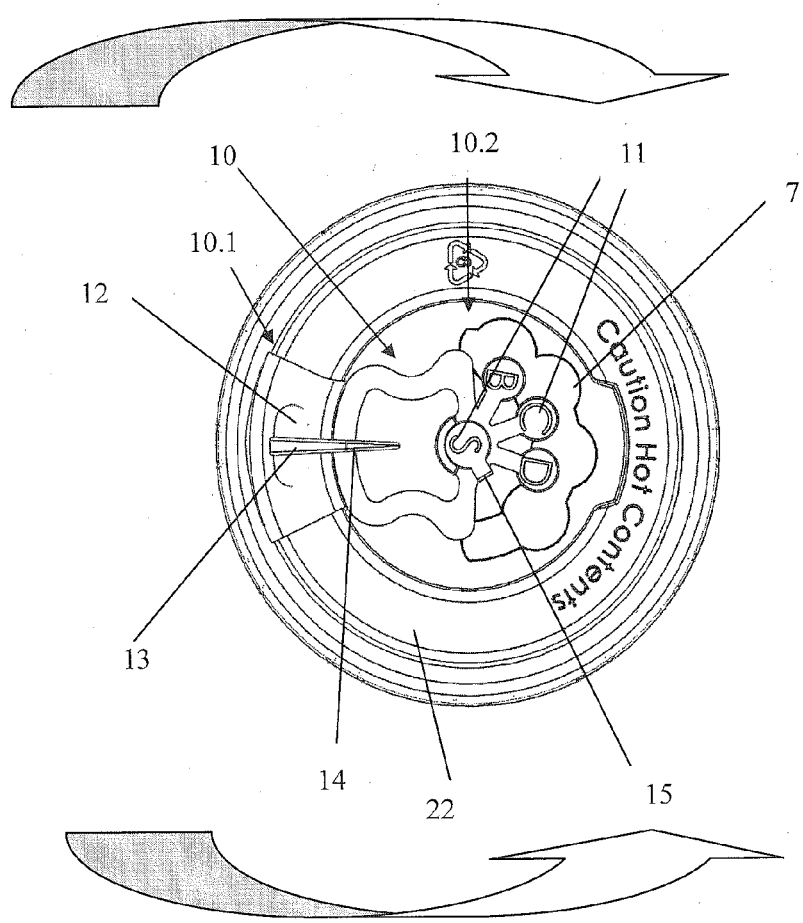
FIG. 3 is a top view of a lid and slider in accordance with one embodiment of the present invention.
Figure 4:
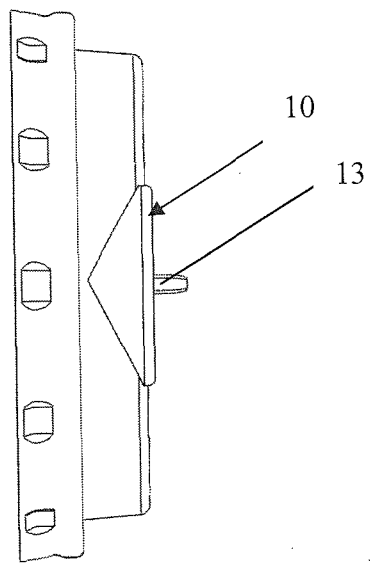
FIG. 4 is a front view of a lid and slider in accordance with one embodiment of the present invention.

FIGS. 3 and 4 show the lid according to FIGS. 1 and 2 in combination with the slider (10). While FIG. 3 is a top view, FIG. 4 is a side view of the inventive lid.

The slider (10) comprises a first end (10.1) and a second end (10.2). By means of the second end (10.2), the slider (10) is connected to the lid (1) as will be described in detail later on. In the vicinity of the second end (10.2) a multitude of different content indicators (11) may be arranged, which are utilized to indicate the consumer the content of the closed container. Each content indicator (11) can be connected via a hinge (15) to the slider (10) around which it can be rotated from a remote position into an indicating position. The content indicators with the letters "B", "C", "D" are in their remote position while the content indicator with the letter "S" is in the indicating position. The content indicators (11) are rotated manually from their remote to their indicating position by, for example, moving the tip of a finger under the respective content indicator (11). This movement is facilitated by the second recess (7).

Furthermore, the connection between the first end (10.1) and the second end (10.2) of the slider (10) can be utilized by a branding. At its first end (10.1), the slider (10) comprises sealing means (12) e.g. a plug, which seals the opening (5) in case that no liquid shall be removed from the container. In order to open the opening (5), the slider (10) can be, as indicated by the large arrows, rotated clockwise or counter-clockwise, if desired by 360°. Furthermore, the first end (10.1) of the slider (10) comprises a handle (13) to facilitate the rotation of the slider (10). As can be particularly seen from FIGS. 4 and 8, the slider (10) may be U-shaped at its first end (10.1). The sealing means (12) are arranged at the base of the U. Together with the two flanks, the U at least partially encompasses the annular ring (22) of the top wall (2). In order to improve the stiffness of the slider (10), the slider (10) may comprise stiffening means (14). As can be particularly seen from FIG. 4, the outer flank is preferably arrow-shaped, so that it can provide indication about the rotational position of the slider.

Figure 5:
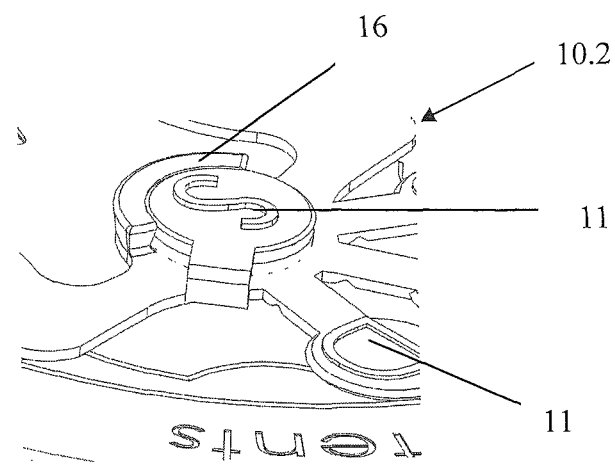
FIG. 5 is an enlarged fragmentary view of content indicators in accordance with one embodiment of the present invention.
Figure 6:
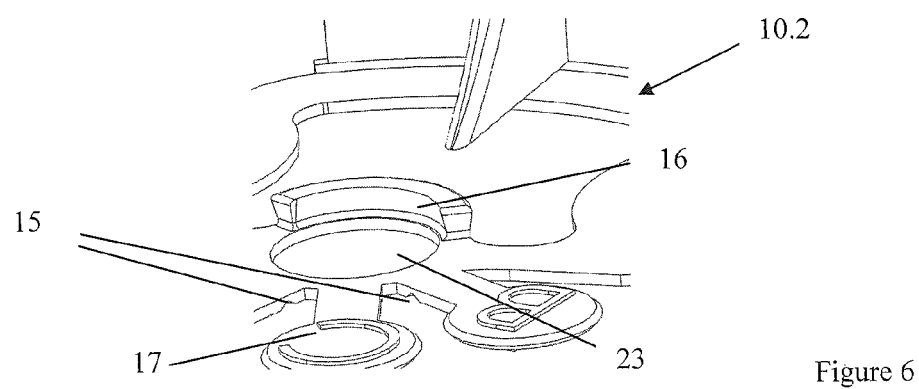
FIG. 6 is an enlarged fragmentary view of content indicators in accordance with one embodiment of the present invention.

FIGS. 5 and 6 show details of the design of the slider at its second end (10.2). At this second end (10.2), the slider comprises an aperture or opening (23), which may be a circle. The diameter of the aperture or circle (23) is slightly smaller than the upper, outer circumference of the convexity (9) which is, in the present case, shaped as a truncated cone. In order to attach the slider (10) to the lid (1), the circle (23) is pushed over the convexity (9). Subsequently, as can be particularly seen from FIG. 5, one content indicator (11), here the content indicator (11) with the embossment "S", has been rotated from its remote position into its indicating position, in which it is fixed by fastening means (16), here a rebound and/or a groove, into which the circumference of the content indicator (11) is partially inserted. FIG. 6 shows details of the second end (10.2). As can be clearly seen, at the circumference of the opening (23) a groove (16) is arranged into which the circumference of the content indicator (11) is inserted. In order to facilitate this insertion, the circumference (17) of the content indicator (11) can be at least partially tapered. A person skilled in the art understands, that the symbol on each content indicator (11) is located on both surfaces so that it can be seen in the remote and in the indicating position.

Figure 7:
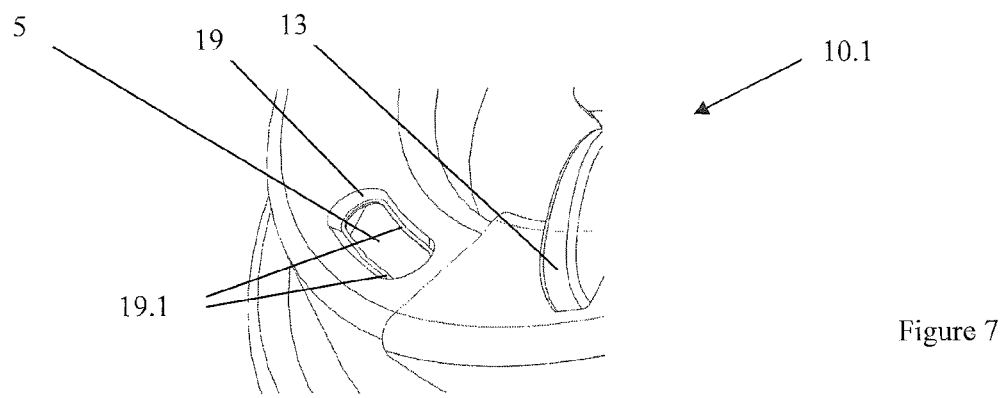
FIG. 7 is a top perspective view of a lid opening and slider in accordance with one embodiment of the present invention.
Figure 8:
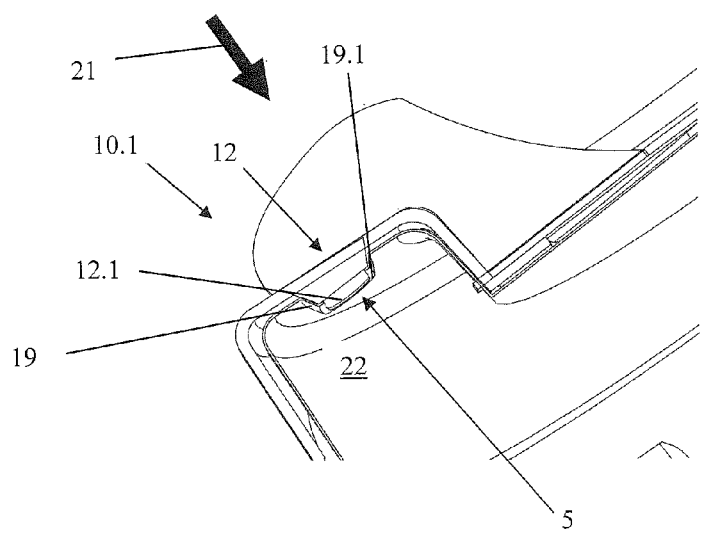
FIG. 8 is a partial sectional view of a lid and slider in accordance with one embodiment of the present invention.

FIGS. 7 and 8 show the opening (5) for the removal, e.g. the drinking, of the fluid in the container. This opening (5) can be opened and closed by rotating the slider (10) clockwise or anti-clockwise around the fastening means (9). In order to close the opening (5), the slider may comprise at its first end (10.1) sealing means (12), e.g. a sealing plug.

As can be particularly seen from FIG. 8, the opening (5) is arranged in an indentation (19), which is e.g. located in the annular ring (22) of the inventive lid. This indentation is e.g. implemented by forming particularly deep drawing. First, the indentation (19) is formed and then the opening (5) is inserted, for example stamped, into this indentation (19). According to one embodiment of the present invention, the sealing means (12) are now not, as taught in the state of the art, inserted into hole (5), but seal the hole (5) in a sealing plane (19.1), which lies above the hole (5); i.e. the sealing area (12.1) of the sealing means (12) seal hole (5) in a sealing plane (19.1) which is located on the upper surface (2.1) of the lid (2). This embodiment of the present invention has the advantage, that larger production tolerances can be allowed, because the sealing means (12) need not sealingly fit into the opening (5). As can be also seen from FIG. 8, the first end (10.1) of the slider (10) is U-shaped. While the base of the U comprises the sealing means, the flanks of the U encompass the annular ring (22). As indicated by arrow (21), the slider is connected to the lid such that the first end (10.1) of the slider may be pre-stressed against the lid. This preferred embodiment of the present invention improves the sealing between sealing means (12) and the sealing area (19.1).

Figure 9:
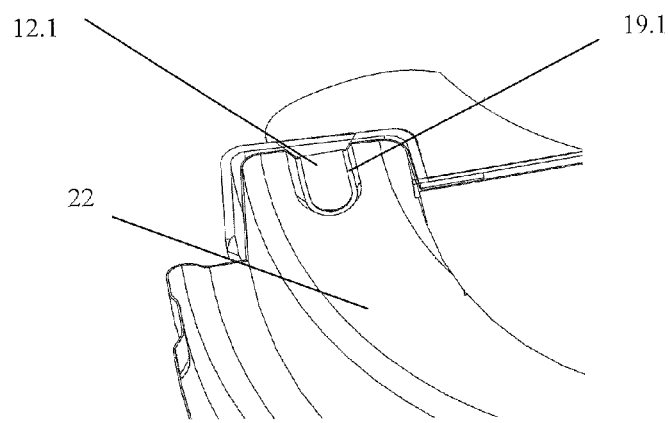
FIG. 9 is a partial sectional view of a lid and slider in accordance with one embodiment of the present invention.

FIG. 9 shows yet another embodiment of the present invention.

In the present case, the annular ring (22) can be tapered towards the center of the lid by the angle ($\alpha$). This embodiment of the present invention assures that liquid that is spilled on the ring (22) flows towards the center of the lid.

Figure 10:
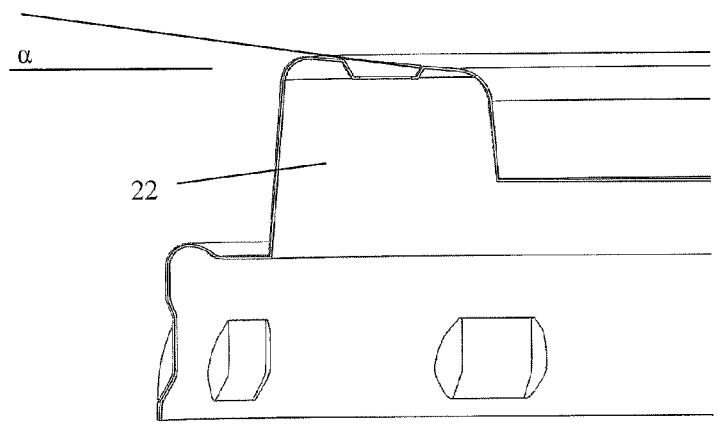
FIG. 10 is a partial sectional view of a lid in accordance with one embodiment of the present invention.

FIG. 10 shows details of the convexity (9). This convexity (9) is in the present case a truncated cone with a draft angle ($\beta$). In the center of the truncated cone, a vent hole (8) may be arranged.

Figure 11:
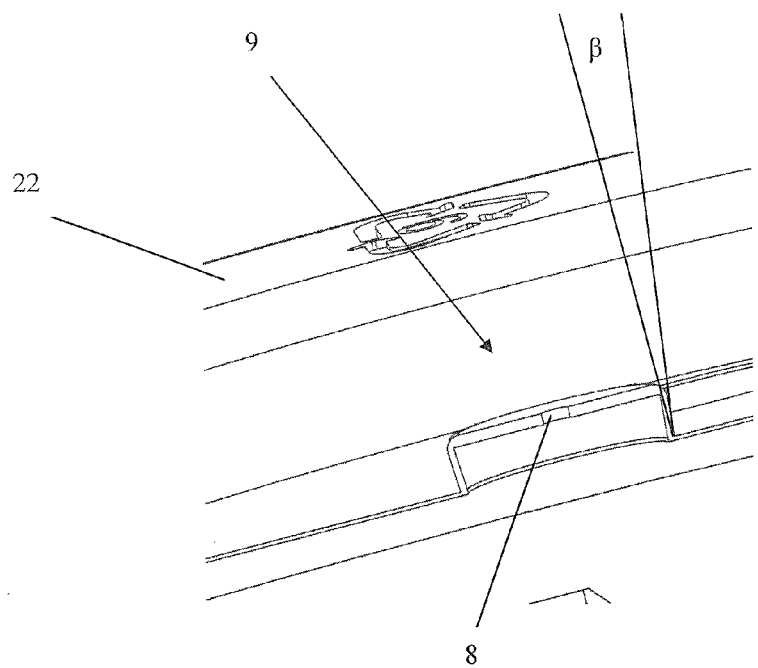
FIG. 11 is a partial sectional view of a lid in accordance with one embodiment of the present invention.
Figure 12:
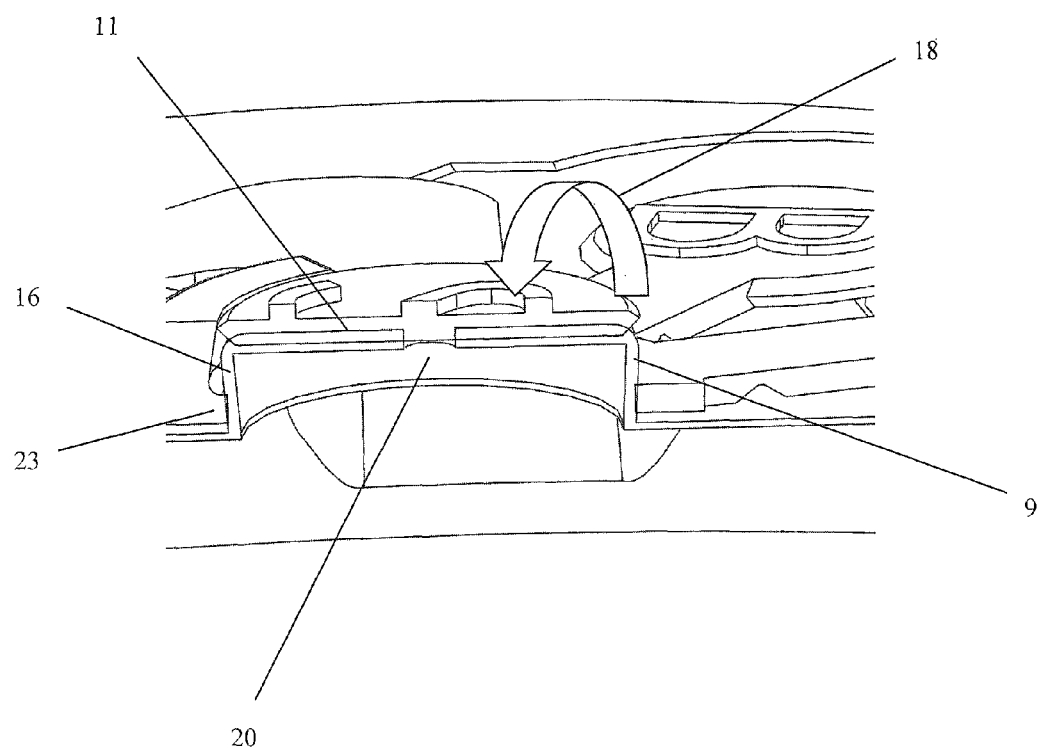
FIG. 12 is a partial sectional view of a lid in accordance with one embodiment of the present invention.

FIG. 11 shows details of the connection of the slider (10) to the lid (1). As can be seen, the convexity (9) is shaped, preferably deep drawn, as a hollow truncated cone, whose diameter increases with its height. i.e. its extension away from the container. The inner diameter of the opening is preferably slightly smaller than the largest outer diameter of the cone, i.e. its outer diameter at its top. In order to connect the slider (10) with the lid (1), opening (23) is first pushed over the truncated cone (9), which results in a first form-fit and/or force-fit-connection between the slider (10) and the lid (1). Subsequently, as indicated by arrow (18), the content indicator (11) is rotated from its remote into its indicating position and fixed with its circumference at the rebound (16). During this rotation, the convexity (9) is slightly, preferably elastically, compressed in its height, which results in an enlargement of the diameter of the convexity (9) as indicated by arrow (20). The deformation forces the upper part of the convexity (9) at least partially into the rebound or groove (16) which improves the connection between the slider (10) and the lid (1). Even though, the content indicator (11) has been rotated into its indicating position, the vent hole (8) remains open so that the content of the closed container can be still vented via this opening From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings All such changes, modifications, variations and other uses and applications which do not depart from the spirit and scope of the invention are deemed to be covered by the invention which is limited only by the claims which follow.

LIST OF REFERENCE SIGNS

1 Lid
2 Top wall
2.1 Upper surface
3 Side wall
4 Mounting portion
4.1 Annular flange
4.2 Skirt
4.3 Depression
5 Opening, fluid removal
6 First recess
7 Second recess
8 Vent hole
9 Convexity, boss, spigot
10 Slider
10.1 First end of the slider
10.2 Second end of the slider
11 Content indicator
12 Sealing means, plug
12.1 Sealing area
13 Handle
14 Stiffening means
15 Hinge, score
16 Fastening means for the content indicator 11, rebound, groove
17 Circumference of the content indicator, Taper
18 Movement of the content indicator
19 Indentation
19.1 Sealing area of the indentation
20 Clipping action
21 Pretension force
22 Circular ring
23 Opening, circle
α Taper angel of the top wall of the annular ring
β Draft angle of the convexity

What is claimed is:

1. A lid for a container holding a flowable substance, said lid comprising:
   a mounting portion to be attached to the container;
   an opening to remove the flowable substance from the container; and
   a slider for selectively opening and closing the opening, said slider being connected to the lid and rotating around a vertical axis, wherein the connection between the slider and the lid is a form-fit- and/or force-fit-connection between a convexity in the lid and an aperture in the slider;
   wherein the slider comprises a content indicator and a fastening means to fix the content indicator in an indicating position;
   wherein the fastening means is a rebound and the content indicator deforms the convexity in the indicating position so that the content indicator preferably extends into the rebound.

2. A method for attaching a slider to a lid, wherein an aperture of the slider is pushed on a convexity of the lid and that the convexity is then at least partially compressed, wherein the slider is provided with a content indicator and that the convexity is compressed by the content indicator.

* * * * *